Figure 1:
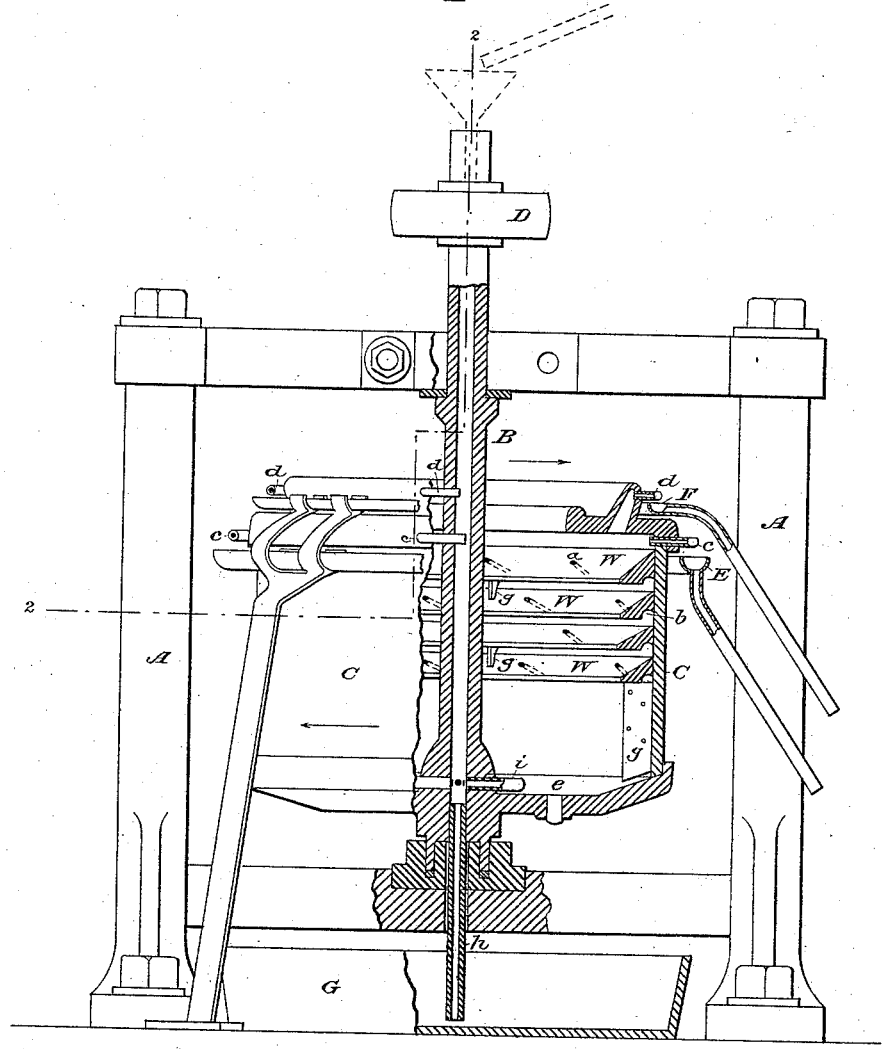

(No Model.)

2 Sheets—Sheet 1.

J. R. POND.
CENTRIFUGAL CREAMER.

No. 301,267. Patented July 1, 1884.

WITNESSES:

INVENTOR:

(No Model.) 2 Sheets—Sheet 2.
J. R. POND.
CENTRIFUGAL CREAMER.
No. 301,267. Patented July 1, 1884.
Fig. 2.
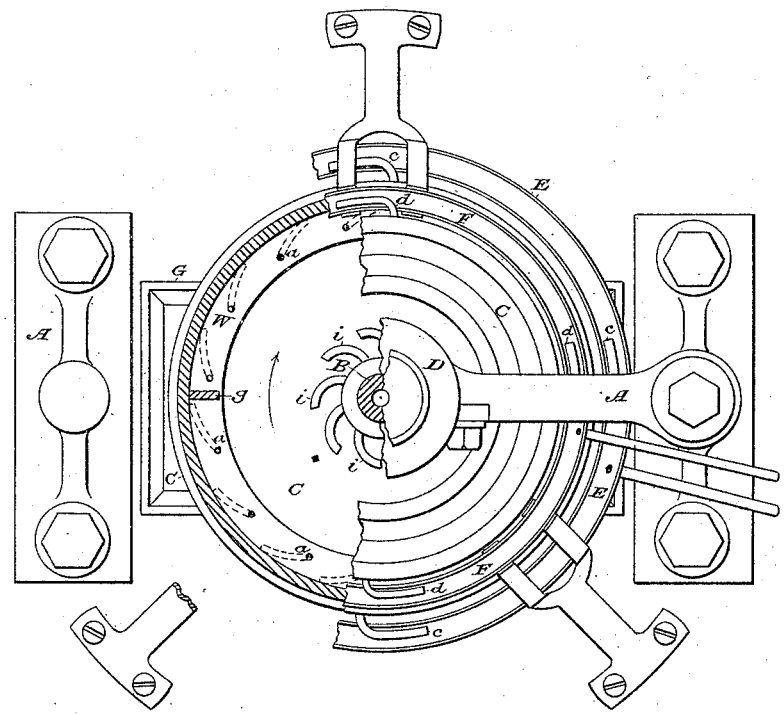
Fig. 3. Fig. 4. Fig. 5. Fig. 6.
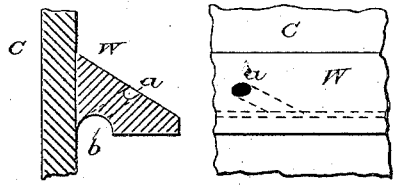
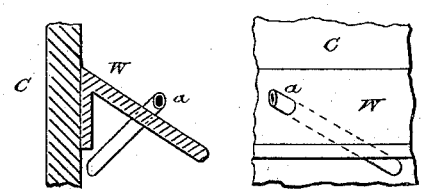
WITNESSES:
E. B. Bolton
Geo. H. Dawson
INVENTOR:
Julius R. Pond
By his Attorneys,
Burke Fraser Hommels
N. PETERS, Photo-Lithographer, Washington, D. C.

UNITED STATES PATENT OFFICE.

JULIUS R. POND, OF WALTON, NEW YORK.

CENTRIFUGAL CREAMER.

SPECIFICATION forming part of Letters Patent No. 301,267, dated July 1, 1884.

Application filed January 2, 1884. (No model.)

*To all whom it may concern:*

Be it known that I, JULIUS R. POND, a citizen of the United States, residing at Walton, in the county of Delaware and State of New York, have invented certain Improvements in Centrifugal Creamers, of which the following is a specification.

My invention relates to that class of centrifugal machines adapted for separating two liquids of different densities from their mixture, and it is primarily designed to facilitate the separation of cream from the "blue milk," so called.

In all machines of this class with which I am acquainted the rotating drum permits a too free flow of the milk up its sides to the discharge-outlet. These machines separate the cream from the blue milk very well, but not with sufficient rapidity, owing to the fact that the solid body of the milk is not sufficiently broken and agitated in its flow, and the cream-globules separate too slowly. My object is to provide a means for breaking up the solid body of the milk as it flows upward toward the outlet, whereby the cream-globules will be the more rapidly disengaged, and the separation of the liquids be in consequence the more rapidly effected.

Heretofore, also, so far as I am aware, in all attempts to introduce the milk at the bottom of the drum by centrifugal action, the milk has been made to enter at or near the periphery or under the annular wall of milk. I prefer to employ my construction, wherein the milk is brought in at the hollow axis and discharged through short reflexed pipes. By this construction the milk is always discharged into the space free from milk. The milk is then immediately thrown out toward the periphery and the outlets kept free.

In the drawings, which serve to illustrate my invention, Figure 1 is an elevation of my improved apparatus or machine, the right half being in vertical mid-section. Fig. 2 is a plan, the left half being in horizontal section on line 2 2 in Fig. 1. Figs. 3 and 4 are detached fragmentary views on a larger scale, which will be referred to hereinafter; and Figs. 5 and 6 illustrate a modification, which will also be referred to hereinafter.

Let A represent any suitable frame, in which is mounted on a vertical axis or shaft, B, the revolving drum C. The shaft B may be rotated through the medium of a pulley, D, or by any other well-known means. The drum may be provided with a brake of any of the well-known forms; but I have not considered it necessary to show this well-known appliance in the drawings.

In order to properly break up the rising wall or column of milk, I provide the inner face of the wall of the drum C with rings W, secured to said wall and provided with oblique holes or passages *a a*. The axes of these passages incline in two directions—that is to say, outwardly from the drum-wall toward the drum-axis, and backwardly. These passages open below, by preference, into an annular groove, *b*, formed in the lower face of the ring, as best shown in Fig. 3, where the ring W is shown in cross-section and on a large scale. The lower opening of the passage *a* is nearest the wall of the drum, and it is ahead of the upper opening as the drum revolves. (See arrow in Figs. 1 and 2.) There may be any number of these rings W placed one above another. The proper number will depend somewhat upon the height and diameter of the drum. The groove *b* tends to gather the milk toward the passages *a*; but I do not consider it to be essential. I prefer to bevel the upper faces of the rings W, in order to facilitate cleansing the drum.

The blue milk is expelled at the reflexed jet-pipes *c c* into a trough, E, and the cream is expelled through reflexed jet-pipes *d d* into a trough, F. These features I do not specifically claim, as they have been used before; nor do I limit myself to their use, especially the cream jet-pipes *d*, as I sometimes prefer to allow the cream to remain until the operation is finished, and then dip it out or draw it off at a stoppered aperture, *e*, in the bottom.

In order that the column or wall of milk may be carried around with the drum, I provide radial partitions *g g* under and between the rings W. These are not, however, perfectly tight, as I do not wish the milk to be carried around with the same speed as the drum. Consequently I leave slight openings at the bottoms or tops of the said partitions; or I may perforate them in lieu of leaving spaces below them, or in addition to that. This is shown in Fig. 1.

I will now describe the operation. Milk is placed in the drum C and it is rapidly rotated. This drives the milk to the wall of the drum, up which it rises, influenced by the action of centrifugal force. The blue milk, having a greater density than the cream, will force its way outward toward the wall of the drum, leaving the cream to form a "cream wall," so called, nearer the axis. Now, the cream-globules do not separate readily under all conditions, and my object is to aid this separation. This is assisted as follows: The milk does not rotate with the same velocity as the drum, owing to the open character of the radial partitions $g$, and the rings W therefore move slowly through the milk. The lower ends of the passages $a$ in the rings being ahead, the milk is forced up through said passages in the manner of an Archimedean screw, being aided partly by the movement of the ring through the milk and partly by the upward movement of the milk along the wall of the drum, due to centrifugal action; but the milk is not permitted to move directly upward. The passages $a$ incline toward the axis, and the milk emerges farther from the drum-wall than where it entered. Consequently, to rise higher, it must again flow outward, so that it flows in a zigzag path to and from the axis, or radially, and also traverses a broken path parallel to the drum-wall. This agitation or fretting of the milk as it flows upward causes the cream-globules to separate rapidly, and by the time the milk reaches the outlet the cream is entirely separated therefrom.

I do not consider the open or perforated radial partitions absolutely necessary to the success of my machine; but it operates best with them. Radial partitions in such machines are not new with me, and I may employ tight partitions or no partitions at all with good results.

I prefer to "stagger" the holes or passages $a$ in the rings, as shown, and the number employed is not important. About twelve holes in a forty-inch ring will produce good results. I prefer, also, to stagger the partitions $g$, as shown, believing this arrangement to produce the best results.

In lieu of the holes or passages $a$, as shown in Figs. 1, 2, 3, and 4, I may employ short sections of pipe, as indicated in Figs. 5 and 6; or any equivalent device that will give the milk the proper zigzag flow and break it up into small currents may be employed.

I will now describe my improved means for introducing the milk to the machine.

The axis B is tubular at its lower end, and is provided with a tube, $h$, which depends into the milk in a vessel, G, or is connected with the milk-reservoir by a pipe or conduit in some other convenient manner. I have shown the simplest mode. Inside of the drum C, and at or near its bottom, the tubular axis B is provided with radial reflexed tubes $i$, (shown best in Fig. 2,) the outer or delivery ends of which turn back, as shown. When the drum is rapidly rotated, a vacuum is formed at the ends of these reflexed tubes, and the milk is lifted through pipe $h$ and discharged into the drum.

I have shown the axis B made tubular throughout, and adapted to be supplied from a funnel (indicated in Fig. 1 by dotted lines) at the top. It will be understood that these are alternative methods of feeding, and when the lower device is employed the upper end of the bore in the axis is stopped, and vice versa; but by providing the machine with two means of feeding it is better adapted for use under varying circumstances.

As the reflexed tubes $i$ are near the axis of the drum, the centrifugal action will keep them free from the milk in the drum, which will be immediately thrown outward.

As the inlet or supply pipe $h$ must depend into the milk in G, in order to insert the pipe, the vessel G may be mounted on a stand having a vertical movement, so that the said vessel can be lifted. This I have not considered it necessary to show, as I do not claim it.

Having thus described my invention, I claim—

1. In a centrifugal machine, the drum C, provided with internally-arranged rings, substantially as shown, said rings being provided with obliquely-arranged passages $a$, or their specified equivalents, substantially as set forth.

2. In a centrifugal machine, the drum C, provided with rings W, having oblique passages $a$, or their specified equivalents, and said drum also provided with radial partitions $g$, all constructed and arranged substantially as set forth.

3. In a centrifugal machine, the drum provided with internally-arranged rings W, and said rings provided with obliquely-arranged passages $a$, or their specified equivalents, and with grooves $b$, all constructed and arranged substantially as set forth.

4. In a centrifugal machine, the combination, with the drum, of its tubular axis provided with the reflexed tubes $i$ and supply-pipe $h$, all arranged substantially as set forth.

In witness whereof I have hereunto signed my name in the presence of two subscribing witnesses.

JULIUS R. POND.

Witnesses:
JOHN S. EILLS,
WILLIAM R. REYNOLDS.